United States Patent [19]

K'o

[11] Patent Number: 4,896,451
[45] Date of Patent: Jan. 30, 1990

[54] ELECTRIC FISHING DEVICE FOR FISHING FROM A SHIP

[76] Inventor: Lien-Wei K'o, 2F, No. 531, Ching-Ping Rd., Chung-Ho City, Taipei Hsien, Taiwan

[21] Appl. No.: 304,855

[22] Filed: Jan. 30, 1989

[51] Int. Cl.4 ............................................ A01K 89/017
[52] U.S. Cl. .................................. 43/26.1; 248/231.4; 242/250
[58] Field of Search ................... 43/18.1, 20, 21, 21.2, 43/26.1; 248/231.4, 216.4, 216.6, 534; 242/84.1 A, 84.1 K, 84.2 A, 106, 220, 84.5 R

[56] References Cited

U.S. PATENT DOCUMENTS

| | | | |
|---|---|---|---|
| 2,743,067 | 4/1956 | Stratton | 43/26.1 |
| 4,349,977 | 9/1982 | Brodribb et al. | 43/26.1 |
| 4,486,968 | 12/1984 | Gould | 43/15 |
| 4,603,501 | 8/1986 | Radcliff | 43/21.2 |

Primary Examiner—Nicholas P. Godici
Assistant Examiner—Michael William Starkweather
Attorney, Agent, or Firm—Browdy and Neimark

[57] ABSTRACT

An electric fishing device for fishing from on board a ship comprising a fixed clamp seat which can be fixed on the top of the bulwarks, a pivotable seat board which is pivoted on the back end upward from the fixed clamp seat, a tube socket to hold a fishing rod on one end of the pivotable set board, a control rod standing vertically and attached at the back end of the seat board, a handle at the top of the control rod with a push switch ont the end of the handle, a D.C. motor attached through a reduction drive with both attached near the front middle of the control rod, the output shaft of the reduction drive connected to a reel through a clutch controlling the drive of the reel by the motor thus saving time during rewinding when bringing in a fish or changing the bait.

2 Claims, 6 Drawing Sheets

B-B SECTION

A-A SECTION

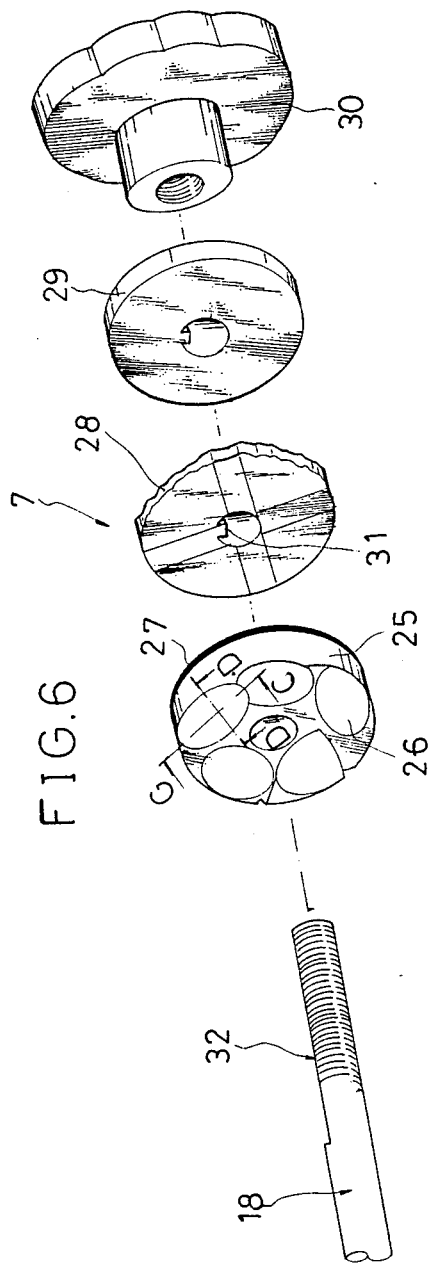

ELECTRIC FISHING DEVICE FOR FISHING FROM A SHIP

FIELD OF THE INVENTION

Present invention relates to an electric fishing device for the ship fishing. It points particularly to an electric device which can be fixed on the bulwarks or other suitable position on the ship to assist fishing. Present invention can fix the fishing rod. No matter when the snell is rewinded for changing the bait or taking the fish, it can utilize the electric to do such rewinding and be operated for saving the human power.

BACKGROUND OF THE INVENTION

Fishing on the ship, no matter where the nearby sea or the like, it is really a good method of the relaxation to the fishing favorites. It can be not only to fish a big one but also can practice a good health. However, tackles for the shore fishing are still utilized for the ship fishing nowaday and operated by human power. The man who does not have a good health is always tired awfully and can not move any more because of the sinker heavied for the deep water fishing and rewinded for several times. Sometimes, owing to the shortage of the human power while fishing a big fish, the fisher cannot but cut off the snell, or he might be pulled into the water by the big fish.

OBJECTS OF THE INVENTION

The object of present invention is to solve aforesaid defects and provides an electric auxiliary fishing device for the ship fishing. Present invention shares the characterics as follow:

1. It can be fixed on the bulwarks or other suitable position on the ship to avoid being pulled by the big fish.

2. When the fish eats the bait, user holds only the handle up of the control rod, and makes the pivot part back end of the pivot seat board of the control rod's low end be the center, and rotates the center backward some degrees. Finally, the fish will be hooked.

3. When the fish is hooked or the snell is rewinded for changing, it needs to push the switch on the up end rim of the handle to actuate the motor and rewind the snell or take the fish by the power.

4. When the bait will be changed, it needs to rotate the control rod backward and rotate the fishing rod into the ship for the change with easy.

SUMMARY OF THE INVENTION

According to one aspect of the invention an electric fishing device for the ship fishing comprises a fixed clamp seat fixed on the bulwarks or other place suitable for the fishing on the ship, a pivot seat board pivoted on the back end up of the fixed clamp seat, a control rod standing vertically and uniting at the back end center of the pivot seat board, a DC motor using the electric power source of the ship and uniting at the low end of a drive reduction, a drive reduction uniting at the front rim middle of the control rod, a reel sleeved on the output shaft of the drive reduction, and a clutch controlling the unite or separation of the reel and output shaft. By the unite together of aforesaid elements, the fixed clamp seat can be utilized to fix on the suitable position on the ship, motor drives the reel to rewind the snell and hook the fish. It can save much human power and also can hook a big fish. The fisher also can not be pulled into the water by the fish.

BRIEF DESCRIPTION OF THE DRAWING

FIG. 6 shows the exploded view of the clutch's structure in FIG. 4.
FIG. 7 is a cross-sectional view taken along line C—C in FIG. 6.
FIG. 8 is a cross-sectional view taken along line D—D in FIG. 6.

SPECIFIC DESCRIPTION

Figure 1:
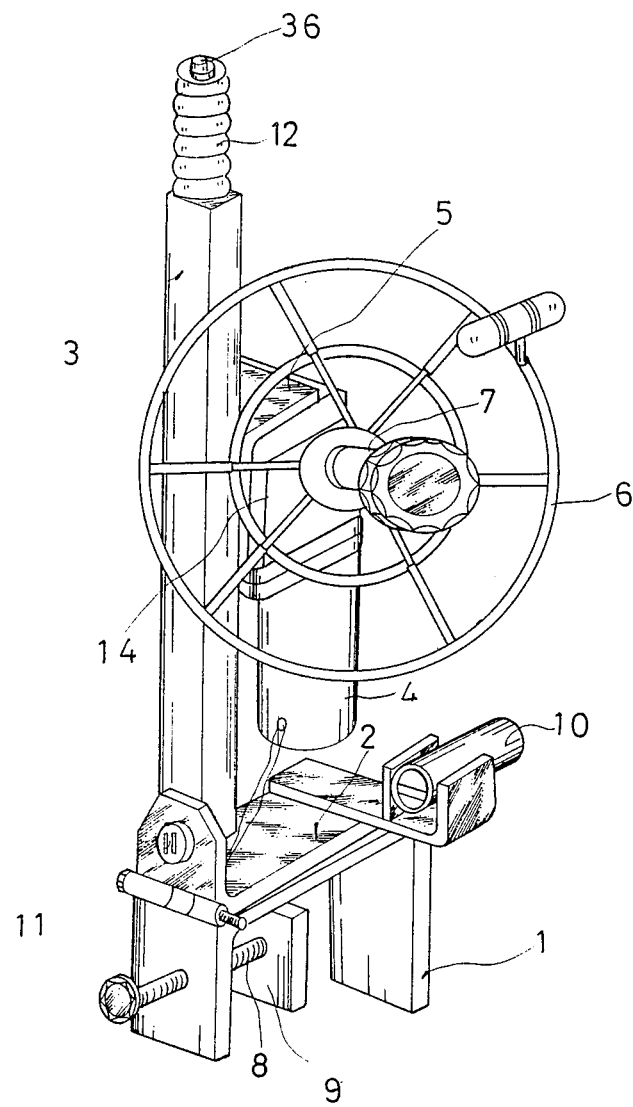
FIG. 1 is a perspective view of the appearance of present invention.
Figure 2:
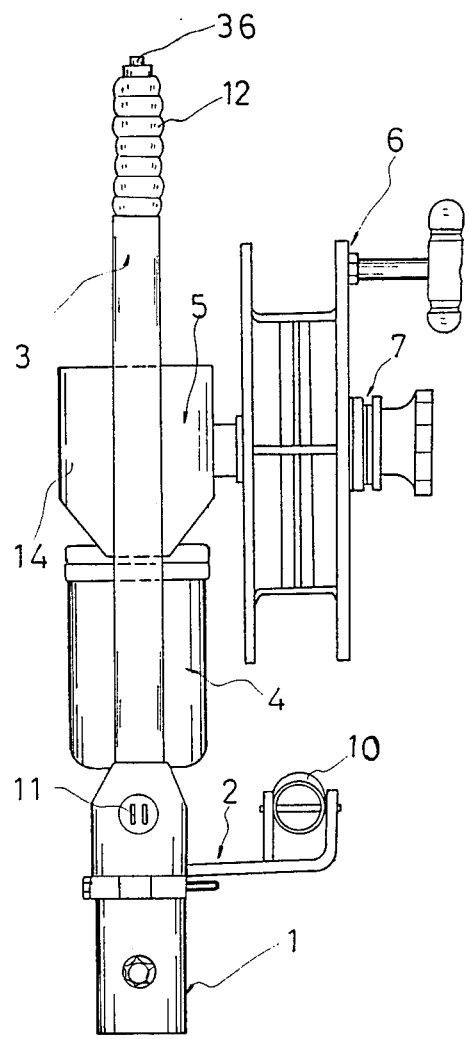
FIG. 2 is a rear view of FIG. 1.
Figure 3:
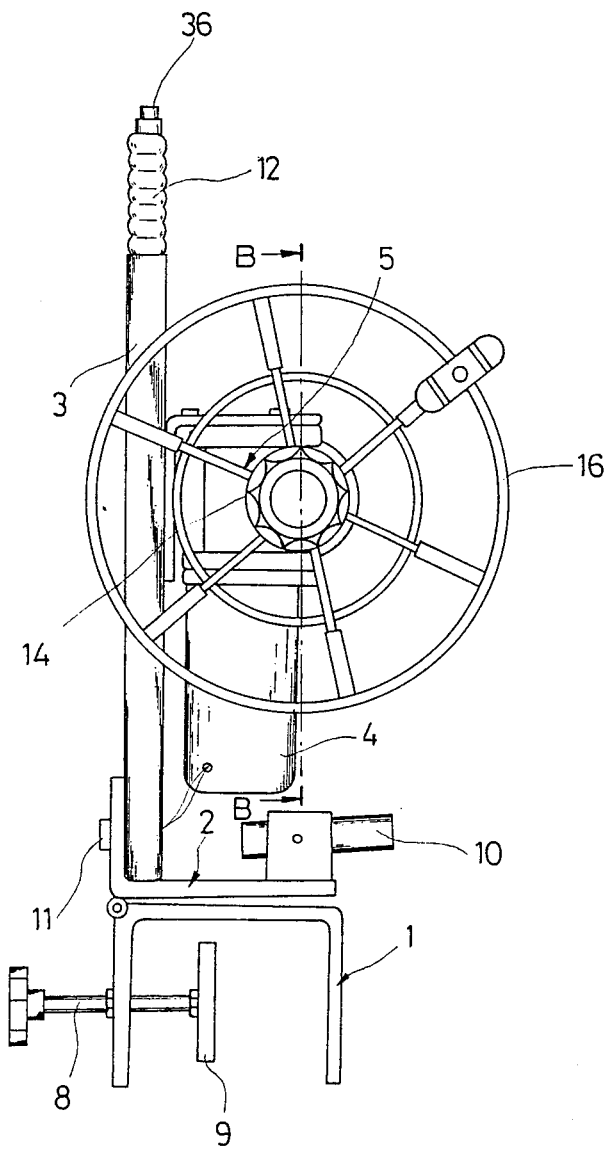
FIG. 3 is a right view of FIG. 2.
Figures 4, 5:
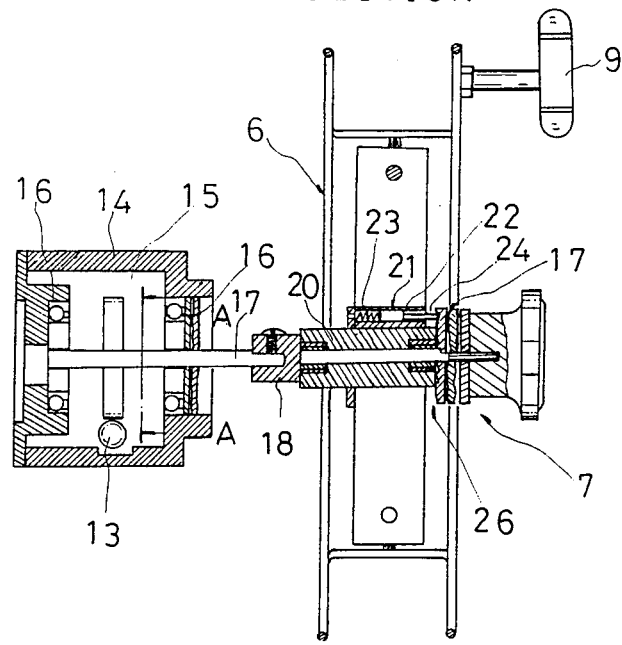
FIG. 4 is a cross-sectional view taken along line B—B in FIG. 3.
FIG. 5 is a cross-sectional view taken along line A—A in FIG. 4.
Figure 9:
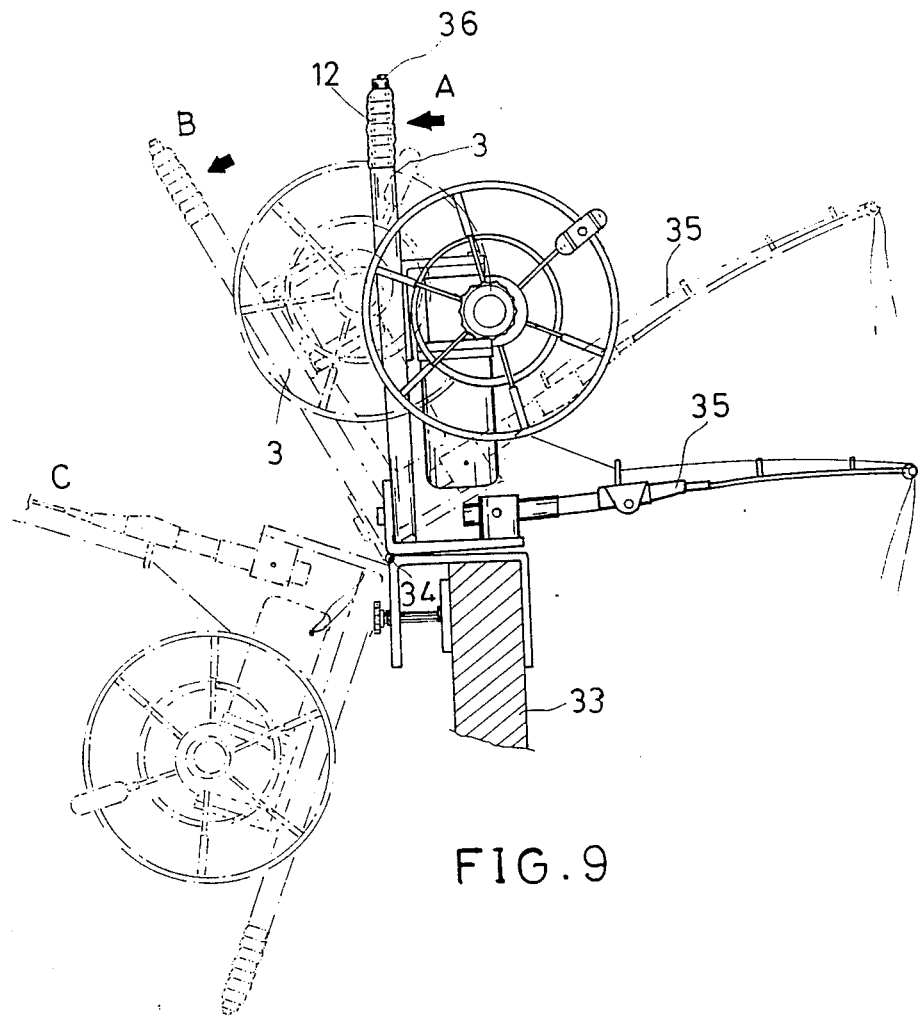
FIG. 9 is a functional view of present invention.

As showing in FIGS. 1, 2, 3 and 4, present invention comprises: a fixed clamp seat 1 fixed on the suitable position of the ship, a pivot seat board 2 pivoted on the back end up of the fixed clamp seat, a control rod 3 standing vertically and uniting at the back end of the pivot seat board, a DC motor 4 using the DC electric power source of the ship and uniting at the low end of a drive reduction, a drive reduction 5 uniting at the front rim middle of the control rod, a reel 6 sleeved on the output shaft of the drive reduction, and a clutch 7 controlling the unite or separation of the reel and output shaft. Wherein, the fixed clamp seat 1 forms in U turn and is sleeved on bulwarks or other suitable position 33 for fishing (as showing in FIG. 9). The fixed clamp seat 1 rotates and drives clamp 9 and fixed closely the position. Said clamp 9 is pivoted at the front of the screw rod 8. At the back end top of said fixed clamp board 1 there is pivoted a pivot seat board 2. At right side of said seat board 2 there is installed a socket 10 to fix the fishing rod 35; and at back up rim there is united vertically the control rod 3. Said control rod 3 is a hollow steel pipe. The hollow part is provided for passing through and containing the wire. At low end of the control rod 3 there is installed a socket 11 to unite the wire with the DC electric source of the ship; and a handle 12 is at the up. There is a push switch 36 at the end face of said handle 12 to control the actuating of DC motor 4. Said DC motor 4 is united under the housing 14 of the drive reduction 5. DC motor 4 and housing 14 are both united at the front middle of said control rod 3. The output shaft of DC motor 4 is a worm 13 (as showing in FIGS. 4 and 5) to extend into the housing 14 to gear the worm gear 15 of the drive reduction 5. Said worm gear 15 is united in said housing 14 by the bearing 16. One end of the output shaft 17 extends out of the right side of the housing 14 and unites the pivot 18 of reel 6 to provide for sleeving the reel 6 and uniting the clutch 7. Said reel 6 installs a handle 19 to provide for the using of human power to rotate said reel 6. A ratchet pawl 21 is installed at the right side of the shaft sleeve 20 middle of the reel 6. Said ratchet pawl 21 is composed of a small cylinder 22, a spring 23 and a pawl 24. By the tension of the spring 23, the pawl 24 is pressed out and tops the relative ratchet 25 of the clutch 7. Said ratchet 25 is also sleeved on the pivot 18 (as showing in FIG. 6), its left side is a concave ratchet face 26 (as showing in FIGS. 7 and 8), and its right unites a fraction plate. A spring plate 28, a press plate 29 and a knob 30 are installed orderly beside said fraction plate 27 on the pivot 18. Wherein, at the shaft holes of the spring plate 28 and the press plate 29 there are installed respectively a flange 31 adapted to the thin and flat part 32 of the pivot 18, and rotate following the pivot 18. Said knob 30 is screwed at the end of the pivot 18. When the knob 30 is screwed at the press plate 29 on the pivot 18 is immediately pushed to squeeze the spring plate 28 and the fraction plate 27 to contact and unite closely. It makes said ratchet pawl 21 top on the concave ratchet face 26 and also makes the motor 4 drive the pivot 18 and the reel 6 to rewind the snell which is put out for fishing. Loosing the knob 30, the reel 6 and the motor separate on the pivot 18 and rotate free. It is convenient for the operation of human power and for putting out the snell.

The use and function of present invention (as showing in FIG. 9) are by the fixedness of the fixed clamp seat 1 of present invention on the bulwarks or other suitable position of the ship. Then, the wire is inserted with the DC source of the ship. The voltage can be 12 or 24. Hooking the biat and put it with the sinker into the sea. Then rotating loosely the knob 30 of the clutch 7 and pull and rotate automatically, by the heavy of the sinker, the reel to put out the snell to the suitable dept for fishing. The knob 30 of the clutch 7 can be immediately rotated close. Owing to the functions of the ratchet pawl 21 of the reel 6 and the ratchet 25 of the clutch 7, it makes the reel 6 be not able to rotate following the direction of the snell putting and be positioned. Then just only wait for the fish to be hooked. When the fish eats the biat, fisher only helds the handle 19 of the control rod 3 and sees the pivot part 34 of the pivot seat board 2 low of the control rod 3 to be the center and moves the handle backward some degrees as to the B position in FIG. 9. Then, the fish will be hooked. At that time, pushing down the push switch 36 and the motor will be driven to rotate the reel to rewind the snell, and the fish is hooked. When the biat will be changed, fisher can make the control rod 3 move backward over 90 degrees and make the fishing rod turn into the ship for changing the bait conveniently.

I claim:

1. An electric fishing device for attachment to bulwarks or other suitable position on a ship when fishing from on board a ship comprising:

a fixed clamp seat and a clamping member forming a substantially U shape and with a clamp screw for driving said clamping member for attachment to the bulwarks or other suitable position on a ship;

a pivotable seat board pivotably connected on one end of said seat board to said fixed clamp seat and a tube socket substantially near the opposite end of said seat board for fixing a fishing rod thereto;

a control rod standing vertically and attached at said one end of said seat board, said control rod being a hollow pipe, having a handle at the top portion of said rod with a push switch on said handle;

a socket at a lower end of said control rod adapted for connection to a shipboard D.C. power source;

a D.C. motor connected to said socket for using the shipboard D.C power source and wired to said push switch for control of actuation of said D.C. motor;

a reduction drive having a worm being the output of said motor connected to a worm wheel;

a reel and an output shaft being a pivot of said reel and extending within said reel and with said output shaft connected to said reduction drive;

clutch means having ratchet face and connected to said output shaft and having a ratchet pawl under spring tension making said pawl press against said ratchet face of said clutch means whereby driving of said motor allows rewinding of said reel using the driving of said motor to rotate said reel.

2. The electric fishing device of 1 wherein
said clutch means includes
said ratchet pawl fixed at one side of said reel;
said ratchet face on a ratchet disc with said ratchet disc having concave portions on one side and a fraction plate on the other side;
a spring plate keyed to said output shaft next to said fraction plate;
a press plate keyed to said output shaft on the side adjacent to said spring plate opposite from said fraction plate;
a knob screwed onto an end of said output shaft;
said reel adapted to be driven by said motor when said knob is tightened on said output shaft against said press plate and said reel adapted not to be driven by said motor when said knob is rotated to a loose position away from said press plate.

* * * * *